United States Patent
Hegde et al.

(10) Patent No.: US 9,747,341 B2
(45) Date of Patent: Aug. 29, 2017

(54) SYSTEM AND METHOD FOR PROVIDING A SHAREABLE GLOBAL CACHE FOR USE WITH A DATABASE ENVIRONMENT

(71) Applicant: ORACLE INTERNATIONAL CORPORATION, Redwood Shores, CA (US)

(72) Inventors: Vidya Hegde, Bangalore (IN); Jean de Lavarene, Menlo Park, CA (US); Pankaj Chand, Bangalore (IN); Douglas Surber, Orinda, CA (US); Tong Zhou, Merrick, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 175 days.

(21) Appl. No.: 14/253,573

(22) Filed: Apr. 15, 2014

(65) Prior Publication Data
US 2015/0026213 A1 Jan. 22, 2015

Related U.S. Application Data

(60) Provisional application No. 61/847,985, filed on Jul. 18, 2013.

(51) Int. Cl.
*G06F 17/30* (2006.01)
*G06F 15/16* (2006.01)

(52) U.S. Cl.
CPC .............................. *G06F 17/3048* (2013.01)

(58) Field of Classification Search
None
See application file for complete search history.

(56) References Cited

U.S. PATENT DOCUMENTS

| | | | |
|---|---|---|---|
| 4,698,749 | A | 10/1987 | Bhadriraju |
| 6,338,089 | B1 | 1/2002 | Quinlan |
| 7,174,539 | B2 | 2/2007 | Dresselhaus |
| 7,257,625 | B2 | 8/2007 | Wu |
| 7,978,544 | B2 | 7/2011 | Bernard |
| 8,285,758 | B1 | 10/2012 | Bono |
| 9,229,993 | B2 | 1/2016 | Odenheimer |
| 2003/0130909 | A1 | 7/2003 | Caci |

(Continued)

FOREIGN PATENT DOCUMENTS

| | | |
|---|---|---|
| WO | 2006073865 | 7/2006 |
| WO | 2012037163 | 3/2012 |

OTHER PUBLICATIONS

DBA Administrators, http://dba.stackexchange.com/questions/13698/what-is-the-difference-between-a-connection-and-a-session, pp. 1-2, Feb. 22, 2012.*

(Continued)

*Primary Examiner* — Alex Gofman
(74) *Attorney, Agent, or Firm* — Tucker Ellis LLP

(57) ABSTRACT

Described herein is a system and method for providing a shareable global cache for use with a database environment. In accordance with an embodiment, a shareable global cache is used for caching connections to database instances. When a request is received for a particular service, the system looks for an idle connection to that service, and, if none is available, locates an existing connection to a database instance serving that service and switches a service on the existing connection to that service.

20 Claims, 6 Drawing Sheets

(56) References Cited

U.S. PATENT DOCUMENTS

| | | |
|---|---|---|
| 2004/0088413 A1 | 5/2004 | Bhogi |
| 2004/0098731 A1 | 5/2004 | Demsey |
| 2005/0015411 A1 | 1/2005 | Altman |
| 2005/0028164 A1 | 2/2005 | Neuwald |
| 2005/0038801 A1 | 2/2005 | Colrain |
| 2006/0143187 A1 | 6/2006 | Mukkamalla |
| 2006/0143396 A1 | 6/2006 | Cabot |
| 2006/0146878 A1 | 7/2006 | Srivastava |
| 2007/0136311 A1 | 6/2007 | Kasten |
| 2008/0052370 A1* | 2/2008 | Snyder .............. G06F 17/30864 709/217 |
| 2009/0064199 A1 | 3/2009 | Bidelis |
| 2009/0094589 A1 | 4/2009 | Gupta |
| 2009/0282369 A1 | 11/2009 | Jones |
| 2010/0322255 A1 | 12/2010 | Hao |
| 2011/0154329 A1 | 6/2011 | Arcese |
| 2011/0218981 A1 | 9/2011 | Retnakumari |
| 2012/0066363 A1 | 3/2012 | Somogyi |
| 2012/0096134 A1 | 4/2012 | Suit |
| 2012/0136602 A1 | 5/2012 | Hossain |
| 2012/0166483 A1 | 6/2012 | Choudhary |
| 2012/0233407 A1 | 9/2012 | Choi |
| 2012/0278293 A1 | 11/2012 | Bulkowski |
| 2012/0281706 A1 | 11/2012 | Agarwal |
| 2013/0018919 A1* | 1/2013 | Peek ................. G06F 17/30474 707/780 |
| 2013/0091153 A1* | 4/2013 | Gitelman .......... G06F 17/30967 707/754 |
| 2013/0117289 A1 | 5/2013 | Fischer |
| 2013/0124807 A1 | 5/2013 | Nielsen |
| 2013/0144984 A1 | 6/2013 | Zhao |
| 2013/0290249 A1 | 10/2013 | Merriman |
| 2014/0129592 A1 | 5/2014 | Samudrala |
| 2016/0012155 A1 | 1/2016 | Shivarudraiah |
| 2016/0077761 A1 | 3/2016 | Stabrawa |
| 2016/0092365 A1 | 3/2016 | Shivarudraiah |

OTHER PUBLICATIONS

Anonymous, Database Connection Pool Management, Research Disclosure, Dec. 1, 1998, 3 pages, vol. 41, No. 416, Mason Publications, Hampshire, GB.

International Searching Authority at the European Patent Office, International Search Report and Written Opinion for PCT International Patent Application No. PCT/US2014/035187, Aug. 5, 2014, 11 pages.

United States Patent and Trademark Office, Office Action Dated Jul. 29, 2016 for U.S. Appl. No. 14/202,348, 15 Pages.

United States Patent and Trademark Office, Office Action Dated May 19, 2016 for U.S. Appl. No. 14/251,410, 16 Pages.

United States Patent and Trademark Office, Office Action Dated May 17, 2016 for U.S. Appl. No. 14/253,580, 12 Pages.

* cited by examiner

SYSTEM AND METHOD FOR PROVIDING A SHAREABLE GLOBAL CACHE FOR USE WITH A DATABASE ENVIRONMENT

CLAIM OF PRIORITY

This application claims the benefit of priority to U.S. Provisional Patent Application No. 61/847,985, filed Jul. 18, 2013, entitled "SYSTEM AND METHOD FOR PROVIDING A SHARABLE SHAREABLE GLOBAL CACHE FOR USE WITH A DATABASE ENVIRONMENT", which application is incorporated herein by reference.

CROSS-REFERENCE TO RELATED APPLICATIONS

This application is related to the following U.S. patent applications, each of which applications is incorporated herein by reference: U.S. Patent Application titled SYSTEM AND METHOD FOR CONNECTION LABELING FOR USE WITH CONNECTION POOLS", application Ser. No. 13/912,086, filed Jun. 6, 2013, now U.S. Pat. No. 9,251,178, issued Feb. 2, 2016; U.S. patent application titled "SUPPORT FOR CLOUD-BASED MULTI-TENANT ENVIRONMENTS USING CONNECTION LABELING", application Ser. No. 13/912,098, filed Jun. 6, 2013, now U.S. Pat. No. 9,268,798, issued Feb. 23, 2016; U.S. patent application titled "SYSTEM AND METHOD FOR PROVIDING A SECOND LEVEL CONNECTION CACHE FOR USE WITH A DATABASE ENVIRONMENT", application Ser. No. 14/253,580, filed Apr. 15, 2014, now U.S. Pat. No. 9,569,472, issued Feb. 14, 2017; U.S. patent application titled "EFFICIENT STORAGE AND RETRIEVAL OF FRAGMENTED DATA USING PSEUDO LINEAR DYNAMIC BYTE ARRAY", application Ser. No. 14/259 499, filed Apr. 23, 2014U.S. patent application titled "SYSTEM AND METHOD FOR MARSHALING MASSIVE DATABASE DATA FROM NATIVE LAYER TO JAVA USING LINEAR ARRAY", application Ser. No. 14/251,410, filed Apr. 11, 2014, now U.S. Pat. No. 9,600,546, issued Mar. 21, 2017; and U.S. patent application titled "SYSTEM AND METHOD FOR TRANSPARENT MULTI KEY-VALUE WEIGHTED ATTRIBUTED CONNECTION USING UNI-TAG CONNECTION POOLS", application Ser. No. 14/202,348, filed Mar. 10, 2014.

FIELD OF INVENTION

Embodiments of the invention are generally related to databases, and connection pools, and are particularly related to a system and method for providing a shareable global cache for use with a database environment.

BACKGROUND

Generally described, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connection is found, a new connection can be created and returned to the application. The application uses the connection to access the database to perform work, and then returns the connection to the pool. The connection can then be made available for subsequent connection requests.

Creating connections can be costly both in terms of time and resources. For example, tasks such as network communication, authentication, transaction enlistment, and memory allocation all contribute to the amount of time and resources it takes to create a connection object. Connection pools allow reuse of such connection objects, and reduce the number of times that objects must be created.

One example of a connection pool is Oracle Universal Connection Pool (UCP), which provides a connection pool for caching JDBC connections. Java applications that are database-intensive can use the connection pool to improve performance and utilization of system resources. A UCP connection pool can use any JDBC driver to create physical connections that are then maintained by the pool. The connection pool can be configured with properties used to optimize pool behaviors, based on the performance and availability requirements of an application.

SUMMARY

Described herein is a system and method for providing a shareable global cache for use with a database environment. In accordance with an embodiment, a shareable global cache is used for caching connections to database instances. When a request is received for a particular service, the system looks for an idle connection to that service, and, if none is available, locates an existing connection to a database instance serving that service and switches a service on the existing connection to that service.

DETAILED DESCRIPTION

Figure 1:
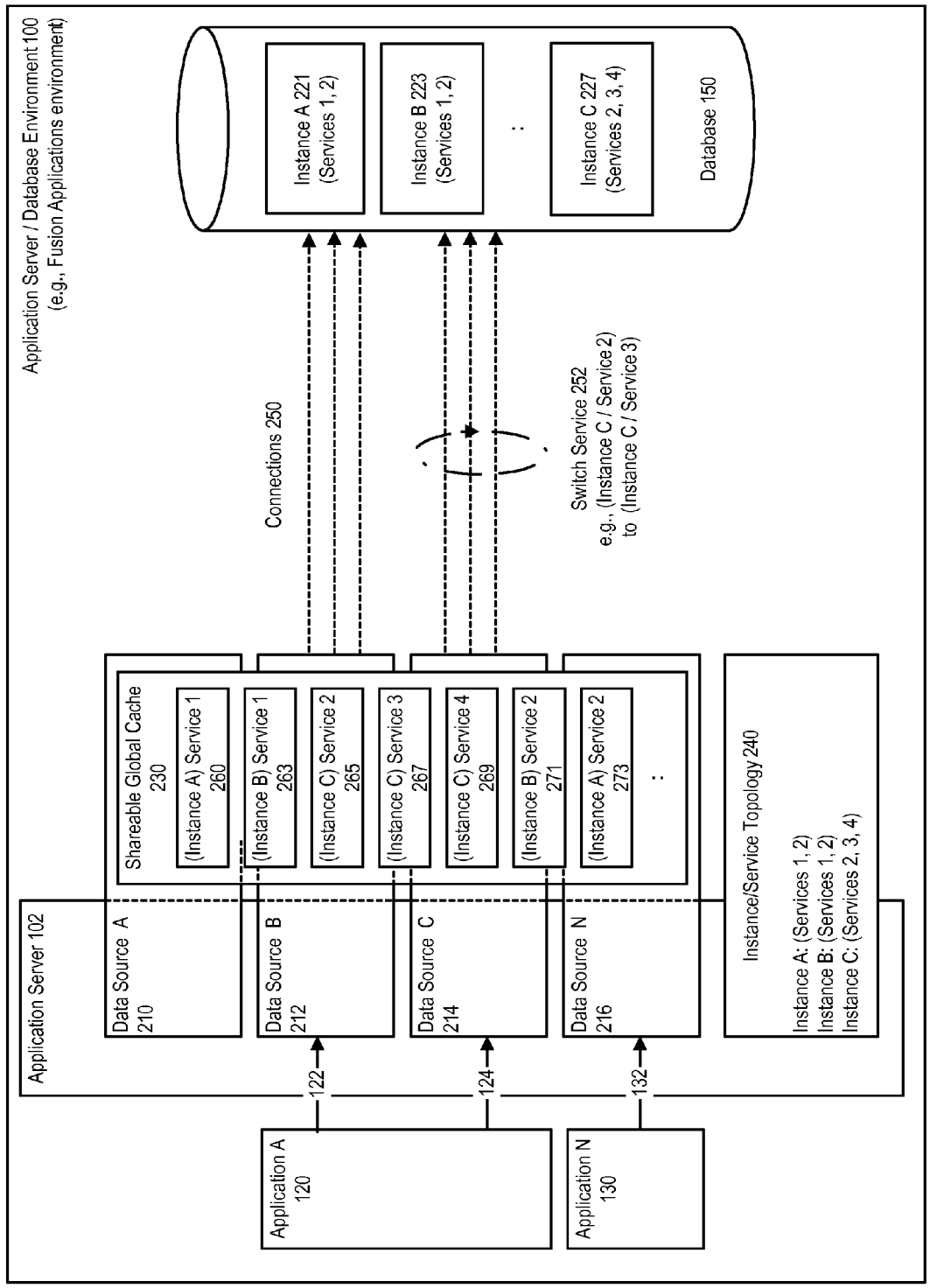
FIG. 1 illustrates a system for a shareable global cache for use in a database environment, in accordance with an embodiment.

As generally described above, a connection pool is a cache of database connection objects. The connection objects represent physical database connections that can be used by a software application to connect to a database. At runtime, an application can request a connection from the pool. If the pool contains a connection that can satisfy the request, it returns the connection to the application. If no connection is found, a new connection can be created and returned to the application. The application uses the connection to access the database to perform work, and then returns the connection to the pool. The connection can then be made available for subsequent connection requests. However, creating connections can be costly both in terms of time and resources.

In an environment that provides access to a database via a connection pool, each of a plurality of data sources can be associated with their own connection cache. However, the connections provided within such a connection cache are typically directed to a particular database instance and service, and cannot be shared by other connection caches, nor can they be used to access other services. When a connection is timed out or closed by such a connection cache, the connection and its resources are released. A request for a new connection from any such connection cache has to be serviced by creating from scratch a new connection for the requested service. This leads to poor scalability, particularly in complex, e.g., multi-tenant cloud environments that utilize a database.

Described herein is a system and method for providing a shareable global cache for use with a database environment. In accordance with an embodiment, a shareable global cache is used for caching connections to database instances. When a request is received for a particular service, the system looks for an existing idle connection to that service, and, if none is available, locates an existing connection to a database instance serving that service and switches a service on the existing connection to that service.

The above-described approach provides scalability and performance improvements, particularly in complex, e.g., multi-tenant cloud environments that utilize a database. Since connections can be shared by other connection caches, and used to access other services, the system can take advantage of a technique such as load balancing to distribute requests among a plurality of database instances.

For example, in accordance with an embodiment, if there is no available connection for a requested database service, then the shareable global cache can be searched for an existing idle connection to a database instance at which the requested service is running. The existing idle connection can be re-purposed by switching the service on that connection. If there is no existing idle connection to such a database instance, then a new connection can be created from scratch.

In accordance with an embodiment, a database environment supports the use of database service instances, or database instances (e.g., Oracle RAC instances). Information about the services provided by each database instance is defined or recorded in an instance/service topology (referred to herein in some embodiments as a service topology).

In accordance with an embodiment, an Oracle Universal Connection Pool (UCP) component can look to the service topology published by RAC instances, to determine which RAC instance provides a requested service, and locate an available connection to that instance.

As an illustrative example, if the service topology describes that database Instances A and B are both serving Services 1 and 2 hosted thereon; while database Instance C is serving Services 2, 3 and 4 hosted thereon; and a request directed to Service 2 is received, the system can first look for an idle connection to a database instance serving Service 2. If no such idle connection is available, the system can look within the service topology to determine those database instances that are serving Service 2. Then, the system can use a technique such as a load balancing technique to determine which instance the request should be communicated to. For example, if load balancing determines that database Instance C should be used, but the only available connections to that instance are to Services 3 or 4, then the system can switch an existing connection from one of these services to Service 2.

In accordance with an embodiment, the system can perform a process similar to that illustrated by the pseudocode provided in Listing 1. In accordance with other embodiments and implementations, other approaches can be used.

---
Listing 1
---
ds X for SRV Y
GetConnection
If available (idle) connection to SRV Y
Return it
Else (a) Find list of instances that serve SRV Y
(b) Get the list of available connections to
these instances
(c) Pick one of the least loaded instances
using load balancing
(d) Switch service
(e) Return it
---

As illustrated in Listing 1, in accordance with an embodiment, if an idle connection for a requested service exists, the system can return the connection to the requesting application. If no such connection exists, the system can perform a service switch procedure which includes determining the best database instance and the best connection to that database instance for the service switch.

Data Source Connection Caches

In accordance with an embodiment, a data source can act as a connection factory, and is traditionally associated with its own connection cache that is allocated a size and a plurality of maximum connections. The size of the cache is typically configured such that a percentage (such as 50%) of the maximum connections are likely to be available at any point in time. This is done to ensure consistent system performance, and to accommodate occasional spikes in demand for connections.

As an illustrative example, in a system with 5 data sources, each data source may be allocated a connection cache with the fixed size of 100 maximum connections. This provides a total of 500 connections within the system. These data sources may have been configured this way to ensure that at least 50% of the connections, or 250 connections, are not used and available most of the time, such that occasional spikes in demand will not significantly degrade system performance.

The connections within such a connection cache are typically isolated and reserved for use for a particular database instance and service. For example, each cache is a connection pool instance that works independently of other pool instances. Each pool also has its own set of available connections not shared among the pool, even if some of the connections connect to the same database instance or service.

Without any shared connection cache, there may be inefficient use of system resources, particularly in larger, multi-tenant environments, such as a multi-tenant cloud environment. The scalability problem also becomes more pronounced in an environment where the number of data sources reaches 50 or higher.

Shareable Global Cache

In accordance with an embodiment, described herein is a system which includes a shared or shareable global cache of connections to services on database instances. When a request for a connection to a particular service is received, the system can first search for an available connection within the data source where the request is received. If no match is found, another search for a suitable connection can be conducted within the shareable global cache. If a match is found in the shareable global cache, the available connection can be passed to and used by the requesting application.

In accordance with an embodiment, service switching can be performed on an idle connection serving a different service in the shareable global cache where a suitable connection for the requested service is not found. In accordance with an embodiment, the global connection cache may also be used with no-session connections and multi-level connection caches.

In accordance with an embodiment, the shareable global cache of connections can reduce the total number of database connections on the system, thus reducing required system load and resources. Use of a shareable global cache can also improve diagonoseability and manageability of the system; and can eliminate the need to maintain a certain number of idle connections at each data source and make database servers more scalable as the total number of data sources increases.

System Including Shareable Global Cache

FIG. 1 illustrates a system for a shareable global cache for use in a database environment, in accordance with an embodiment. As shown in FIG. 1, in accordance with an embodiment, an application server 102 resides within an application server or database environment 100, such as an Oracle Fusion Applications environment. Applications 120 and 130 can interact with the application server. The applications can request connections 250 to instances (e.g., A 221 through C 227) of the database 150 from one or more of the data sources 210, 212, 214, and 216.

In accordance with an embodiment, a plurality of database services can be provided by the database instances, each of which can provide or host one or more of these database services. As an illustrative example, as shown in FIG. 1, Instance A provides Services 1 and 2, and Instance C provides Services 2, 3, and 4.

In accordance with an embodiment, each of the data sources can maintain its own associated cache, and each of these caches can include a plurality of connections for a particular service. As an illustrative example, data source 210 can contain connections for Service 1, whereas data source 212 can contain connections for Service 2.

In accordance with an embodiment, the system includes a shareable global cache 230, which can include a plurality of connections, e.g., 260 through 273, each of which is configured for a particular service and can connect to a database instance that provides that service.

In accordance with an embodiment, the shareable global cache can be created and managed by a UCP pool manager, and provide connections to each of the data sources configured to share the connections in the shareable global cache.

In accordance with an embodiment, a service topology structure that describes relationships between the database instances and the database services can be used. As an illustrative example, service topology 240 can describe that Instance A provides Services 1 and 2; that Instance B provides Services 1 and 2; and that Instance C provides Services 2, 3, and 4.

In accordance with an embodiment, each of the connections in the shareable global cache and in the data sources' individual caches includes the name of the service for which the connection is configured. For example, the service name can be included as part of the connection's Connection Retrieval Information (CRI), and can be used to match the connection with a connection request for the particular service.

A connection request for a particular service can also include the name of the requested service, and the service name can be used to identify an appropriate connection in the global connection cache.

In accordance with an embodiment, the request can be received by a data source that includes its own connection cache of connections for the requested service. If such a connection is available, the connection can be provided to the requesting application. If no such connection is idle in the connection cache of the data source, a search can be made within the shareable global cache to locate an idle connection for the requested service.

If no such connection is found, but a connection to a database instance serving the requested service is idle in the shareable global cache, the idle connection can still be used by first performing a service switch thereon, which can modify the idle connection originally configured for a different service into a connection for the requested service.

If, however, no idle connection exists within the shareable global cache, a new connection can be created from scratch for the requested service, or an error message can be generated.

In accordance with an embodiment, as an illustrative example, the system can perform a process similar to that illustrated by the pseudo code shown in Listing 2.

| Listing 2 |
|---|
| Connection getConnection(Service Y)<br>  IF available connection in (local_cache)<br>    Return connection<br>    ELSE IF available connection for Y in shareable global cache<br>      Return connection from shareable global cache<br>      ELSE IF available connection for different service in shareable global cache<br>        (a) Get list of instances that serve Y<br>        (b) Get list of all available connections to these instances<br>        (c) Pick a best candidate database instance, e.g., using load balancing<br>        (d) Pick a best candidate connection to perform a service switch<br>        (e) Switch service on the connection<br>        (f) return the connection<br>      ELSE create and return a new connection |

As shown in Listing 2, when an available connection for the requested service is not found in either the connection cache of a data source that receives the request, or the shareable global cache, the system can start a service switch with gathering a list of database instances that provide the requested service.

As further shown in Listing 2, the system can gather a list of available connections in the shareable global cache that connect to the list of database instances, and choose a best candidate database instance using a technique such as load balancing. In accordance with an embodiment, one or more criteria, e.g., the database instance with currently the least load, can be used to select the best candidate database instance.

In accordance with an embodiment, the system can then identify, from the list of available connections to the list of database instances, the best candidate connection on which to perform a service switch. In accordance with an embodiment, one or a combination of methods, such as affinity, run-time connection load-balancing (RCLB) and connection labeling, can be used to identify the best candidate connection.

Figure 2:
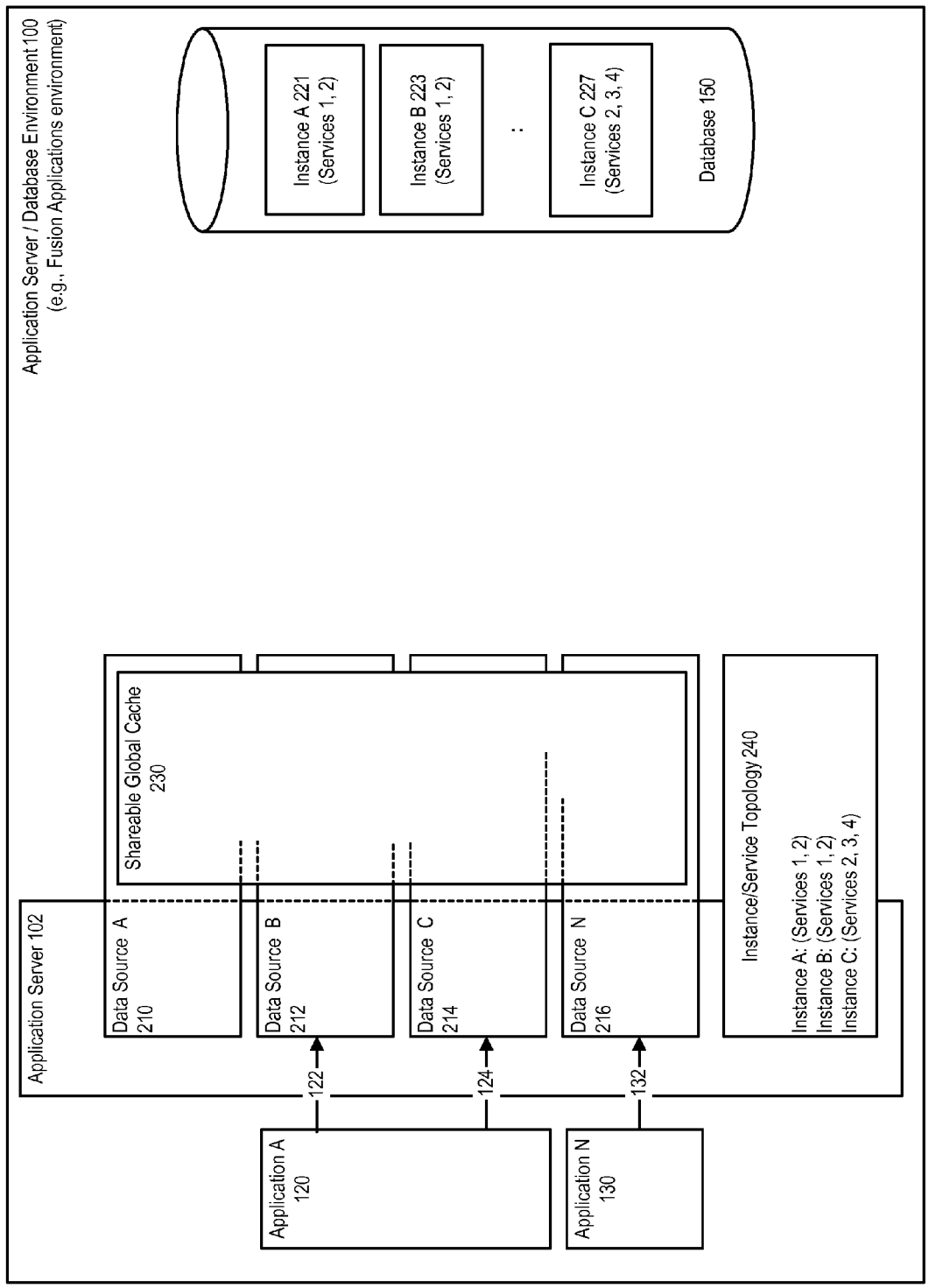
FIG. 2 further illustrates a system for a shareable global cache for use in a database environment, in accordance with an embodiment.

FIG. 2 further illustrates a system for a shareable global cache for use in a database environment, in accordance with an embodiment.

As shown in FIG. 2, in accordance with an embodiment, the system can be initialized by first creating an instance of a pool manager. The pool manager instance can create and initialize a singleton instance of an empty pool that can act as the shareable global cache. Thereafter, more instances of connection pools can be created using the pool manager instance to share connections to be cached in the shareable global cache.

Figure 3:
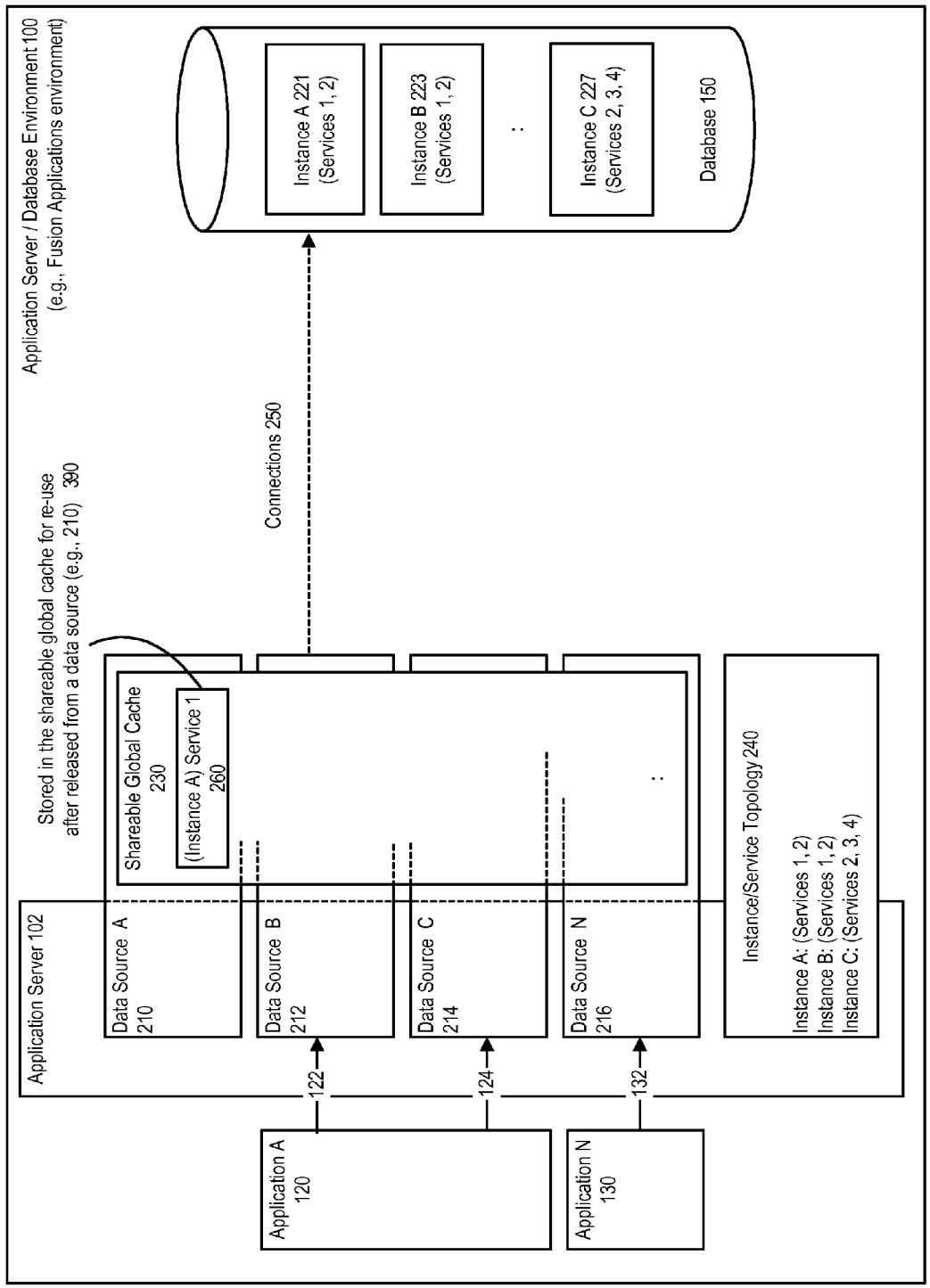
FIG. 3 further illustrates a system for a shareable global cache for use in a database environment, in accordance with an embodiment.

FIG. 3 further illustrates a system for a shareable global cache for use in a database environment, in accordance with an embodiment.

In accordance with an embodiment, when the system receives a connection request for Service 1 at a data source, e.g., 210, which includes connections for the particular service, an idle connection that can fulfill the request is found within the connection cache on the data source and provided to the requesting application.

In accordance with an embodiment, when the connection is closed because of a timeout or any other reason, such as pool recycling, the connection 260 can be stored 390 to the shareable global cache, so that the connection can be re-used by connections pools associated with other data sources.

As an illustrative example, when a request for Service 1 is received at e.g., data source 212 from an application, the connection stored in the shareable global cache can be provided to that application.

In accordance with an embodiment, there is an upper limit on the number of connections that can be present in the shareable global cache. If the number of connections exceeds this limit, there will be no additional connections returned to the shareable global cache, until its size is reduced below the limit. In accordance with an embodiment, if at any point of time the size of the shareable global cache is zero, a new connection request that reaches the shareable global cache can be serviced by creating a new connection.

In accordance with an embodiment, the count of the number of connection pools instances that reference the shareable global cache is maintained by the UCP pool manager. When there are no more connection pool referencing the shareable global cache, the remaining connections therein can be cleaned up. In accordance with an embodiment, when the pool manager is destroyed, the associated shareable global cache is also destroyed.

Figure 4:
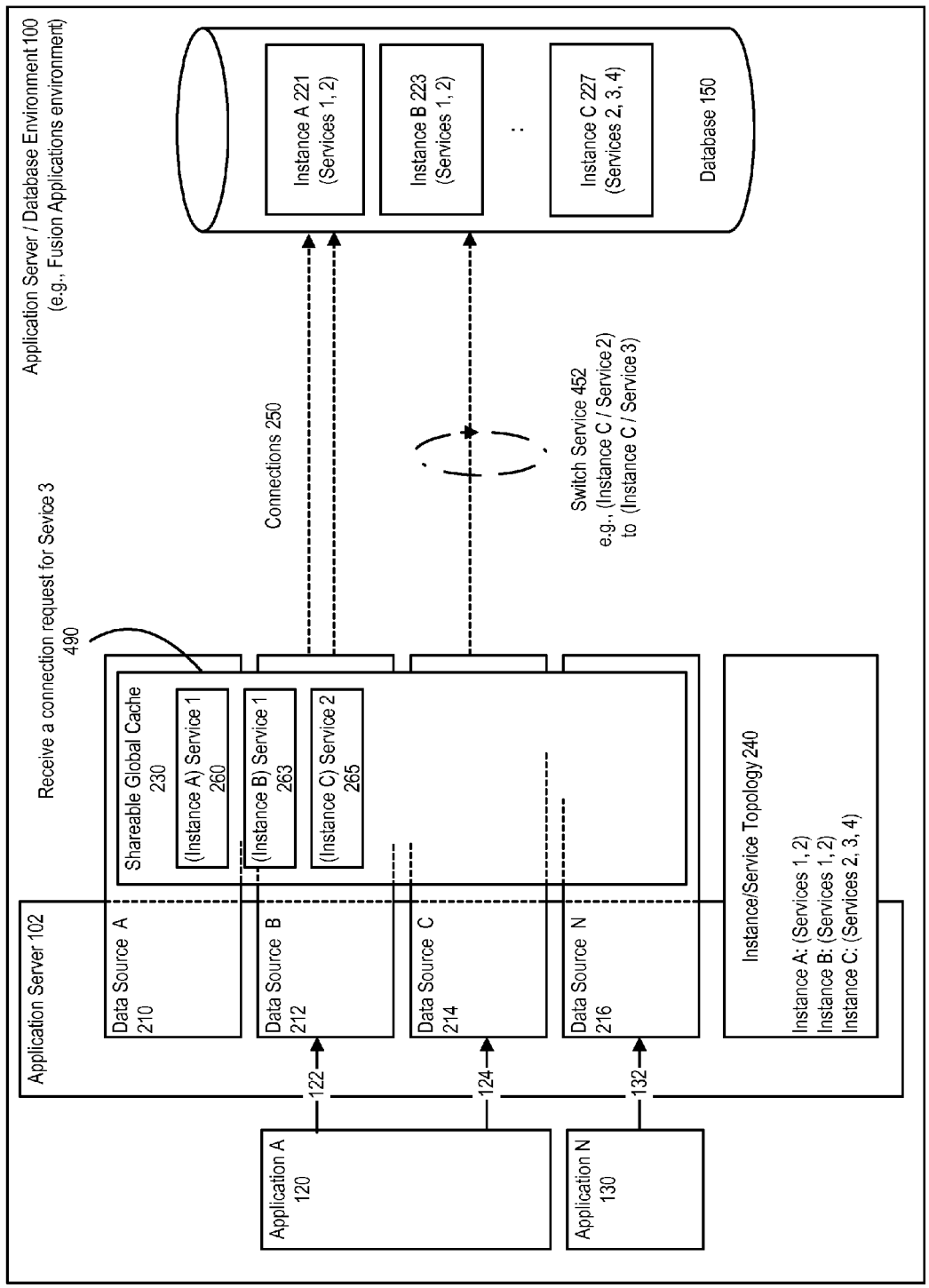
FIG. 4 further illustrates a system for a shareable global cache for use in a database environment, in accordance with an embodiment.

FIG. 4 further illustrates a system for a shareable global cache for use in a database environment, in accordance with an embodiment. As illustrated in FIG. 4, the example shareable global cache includes three connections 260, 263 and 265, each of which connects to a different database instance.

In accordance with an embodiment, when a connection request for a service, e.g., Service 3 is received 490 at a data source, the system can search for an idle connection for the service first in the data source connection cache, and then in the shareable global connection cache. If such a connection is not available in either cache, a service switch procedure can be performed on one of the available connection to a database instance that provides the requested service.

As an illustrative example, an available connection in the shareable global cache that connects to Instance C, which provides Services 2, 3 and 4 as described by the service topology, can be selected for the service switch.

In accordance with an embodiment, an application programming interface (API) can be provided to initiate a new service on the selected connection for the service switch. In accordance with an embodiment, the name of the service that a connection is configured for is maintained thereon as part of the connection retrieval information (CRI).

As shown in FIG. 4, in accordance with an embodiment, after the best candidate connection (e.g., 265) is identified, the service (e.g., Service 2) maintained on the connection is switched 452 to the requested serviced (e.g., Service 3), and the reconfigured connection can be provided to a requesting application.

Method of Providing a Shareable Global Cache

Figure 5A:
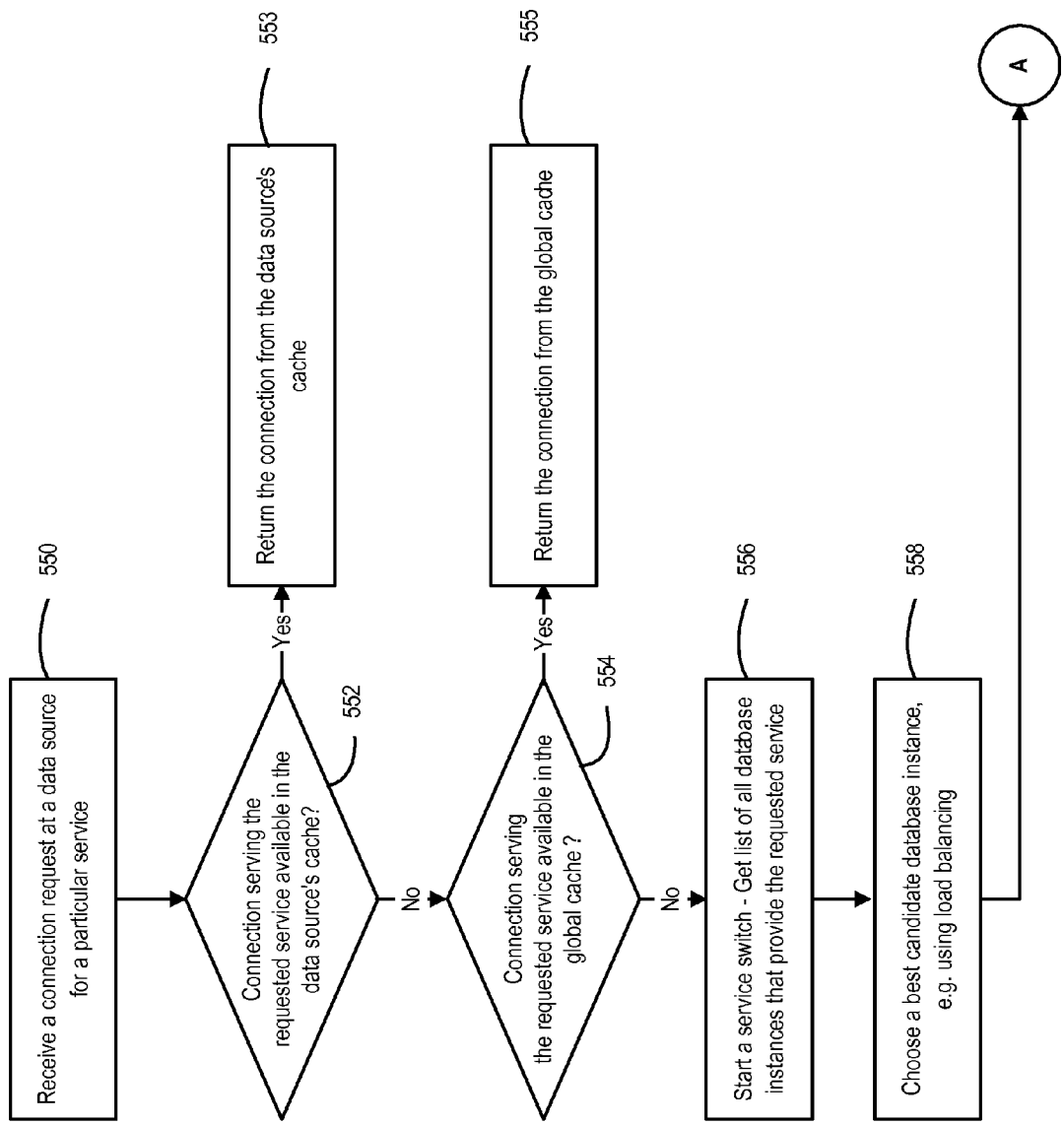
FIG. 5A is a flow chart that illustrates the process of handling a connection in an environment with a shareable global cache and service switch enabled, in accordance with an embodiment.

FIG. 5A is a flow chart that illustrates the process of handling a connection in an environment with a shareable global cache and service switch enabled, in accordance with an embodiment.

As shown in FIG. 5A, in accordance with an embodiment, at step 550, the system can receive a database connection request for a particular database service at a data source.

At step 552, the system checks whether a connection serving the requested service is available in the connection cache associated with the data source.

At step 553, if there is such a connection, the connection can be returned to the requesting application.

At step 554, if no such connection is available in the data source's own connection cache, the system can search for an available connection serving the requested service in the shareable global cache.

At step 555, if a match is found, the matching connection can be returned to the requesting application.

At step 556, if there is still no match in the shareable global cache, the system can initiate a service switch procedure by gathering a list of database instances that provide the requested service.

At step 558, the system can choose a best candidate database instance for a service switch using, e.g., load balancing to find the least loaded database instance.

Figure 5B:
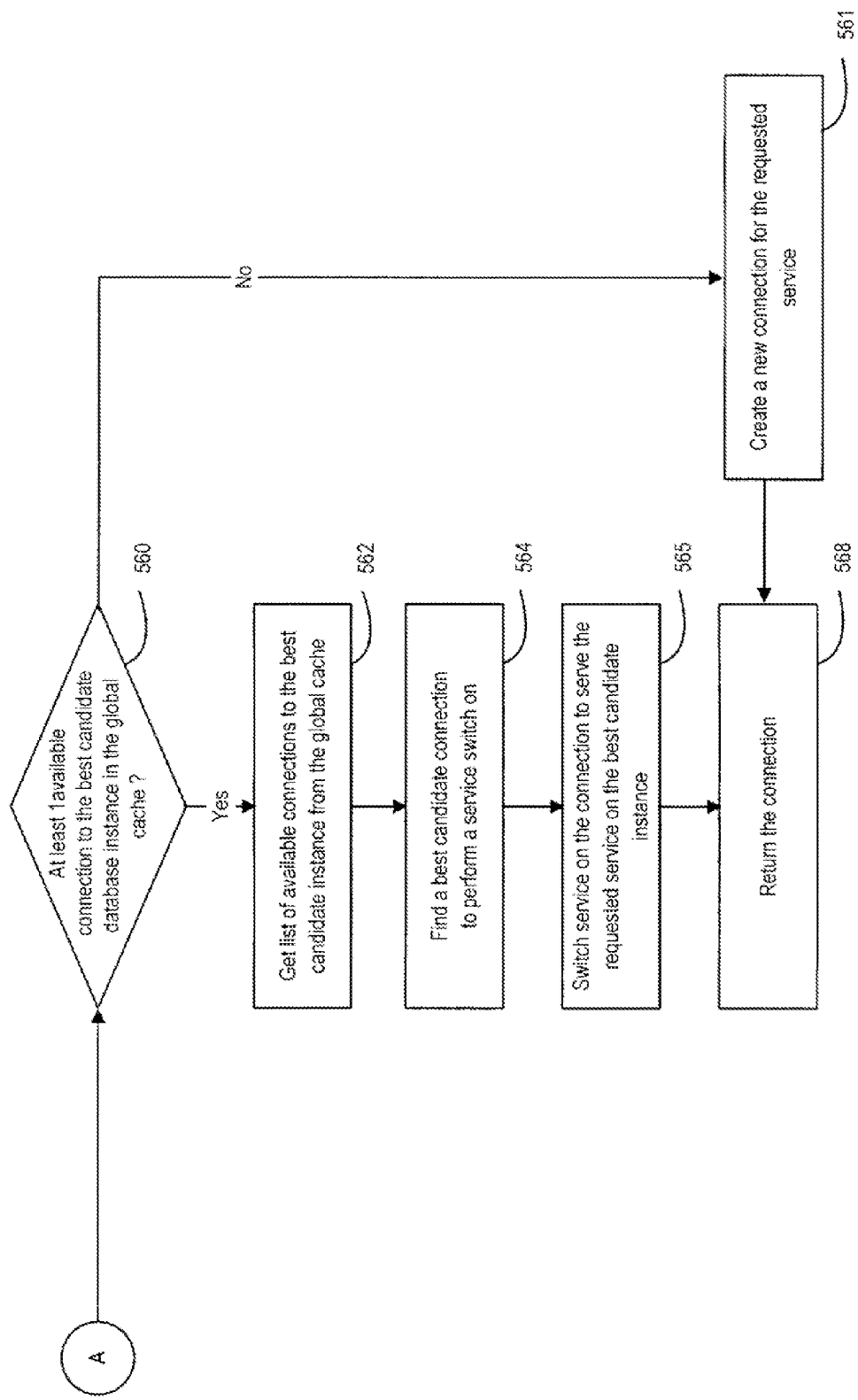
FIG. 5B is a continuation of the flowchart of FIG. 5A, in accordance with an embodiment.

FIG. 5B is a continuation of the flowchart of FIG. 5A, in accordance with an embodiment.

In accordance with an embodiment, at step 560, the system can check if there exists in the shareable global cache at least one available connection to the best candidate database instance for a service switch. In accordance with an embodiment, if at least one such connection exists in the shareable global cache, it would be for a database service other than the requested service, because a connection for the requested service would have been returned at step 555 of FIG. 5A.

At step 561, in accordance with an embodiment, if in the shareable global cache there is no available connection to the best candidate database instance, i.e. there is no candidate connection to perform a service switch on, the system can generate a new connection for the requested service from scratch and return the connection to the requesting application.

At step 562, in accordance with an embodiment, if in the shareable global cache there is at least one available connection to the best candidate database instance for a service switch, the system can gather a list of the available connections.

At step 564, the system can find a best candidate connection from the list of available connections using, e.g., affinity, RCLB, or connection labeling in accordance with an embodiment.

At step 565, a service switch can be performed on the best candidate connection to serve the requested service.

At step 568, the service-switched connection can be returned to the requesting application.

Service Topology

In accordance with an embodiment, a service topology defining and describing relationships between the database instances and database services can be used for the service switch. For example, in accordance with an embodiment, the service topology can be enabled to publish database services that each database service provides, and database instances to which each connection in the shareable global cache connects.

As an illustrative example, when gathering a list of all database instances that serve a requested service, the service topology can be examined determine the database instances that serve the particular service and connections to the database instances within the shareable global cache.

As another illustrative example, in accordance with an embodiment, the service topology can describe that database instances A and B both host database Services 1 and 2, and that database instance C hosts Services 2, 3 and 4.

When a connection request for Service 2 is received, the system can first look for an idle connection to an instance serving Service 2 in the data source's cache, and then in the shareable global cache.

If an idle connection for Service 2 is not available in either cache, the system can examine the service topology to determine those database instances serving Service 2 to locate an instance as part of the service switch procedure.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing a global cache for use with a database environment, the system comprising:
a computer including a processor;
a database that includes a plurality of database instances, wherein each of the plurality of database instances hosts one or more services;
an application server on the computer, wherein the application server includes
a plurality of data sources and a plurality of connection caches, wherein each data source is associated with a connection cache that includes a plurality of connections, and
a global cache shared by the plurality of data sources, wherein the global cache includes a plurality of connections,
wherein each connection in the plurality of connection caches and the global cache is configured for a service hosted on one or more instances of the plurality of database instances; and
whereupon receiving, at one of the plurality of data sources, a request for a service, the system
determines that an idle connection configured for the requested service is not available in the connection cache associated with the data source that receives the request or in the global cache,
identifies, from the plurality of database instances, a database instance that hosts the requested service;
locates, within the global cache, an idle connection configured for a different service on the identified database instance,
repurposes the idle connection configured for the different service, wherein the repurposing includes switching the different service which the idle connection is configured for to the requested service, and
directs the request to the requested service on the identified database instance using the repurposed idle connection.

2. The system according to claim 1, further comprising a data defining a service topology, which describes a plurality of services that the database instances host.

3. The system according to claim 1, wherein the global cache includes one or more connections not attached with a database session.

4. The system according to claim 1, wherein the identified database instance is the least loaded database instance.

5. The system according to claim 1, wherein each connection in the plurality of connection caches associated with the plurality of data sources and the global cache further includes information describing a name of the service that the connection is configured for.

6. The system according to claim 1, wherein the database and application server are used in a multi-tenant cloud environment.

7. The system of claim 1, wherein when a connection in a connection cache associated with a data source is closed, the connection is stored in the global cache.

8. A method for providing a global cache for use with a database environment, the method comprising:
providing an application server executing on a microprocessor, wherein the application server includes
a plurality of data sources and a plurality of connection caches, wherein each data source is associated with a connection cache that includes a plurality of connections, and
a global cache, which includes a plurality of connections,
wherein each connection in the plurality of connection caches and the global cache is configured for a service hosted on one or more database instances of a plurality of database instances in a database;
receiving, at one of the plurality of data sources, a request for a service;

determining that an idle connection configured for the requested service is not available in the connection cache associated with the data source that receives the request or in the global cache;

identifying, from the plurality of database instances, a database instance that hosts the requested service;

locating, within the global cache, an idle connection configured for a different service on the identified database instance;

repurposing the idle connection configured for the different service, wherein the repurposing includes switching the different service which the idle connection is configured for to the requested service; and directing the request to the requested service on the identified database instance using the repurposed idle connection.

9. The method according to claim 8, further comprising providing a data defining a service topology, which describes a plurality of services that the database instances host.

10. The method according to claim 8, wherein the global cache includes one or more connections not attached with a database session.

11. The method according to claim 8, wherein the identified database instance is the least loaded database instance.

12. The method according to claim 8, wherein each connection in the plurality of connection caches associated with the plurality of data sources and the global cache further includes information describing a name of the service that the connection is configured for.

13. The method of claim 8, wherein when a connection in a connection cache associated with a data source is closed, the connection is stored in the global cache.

14. A non-transitory computer readable storage medium, including instructions stored thereon which when read and executed by one or more microprocessors cause the one or more microprocessors to perform the steps comprising:

configuring an application server to include
a plurality of data sources and a plurality of connection caches, wherein each data source is associated with a connection cache that includes a plurality of connections, and
a global cache, which includes a plurality of connections,
wherein each connection in the plurality of connection caches and the global cache is configured for a service hosted on one or more database instances of a plurality of database instances in a database;

receiving, at one of the plurality of data sources, a request for a service;

determining that an idle connection configured for the requested service is not available in the connection cache associated with the data source that receives the request or in the global cache;

identifying, from the plurality of database instances, a database instance that hosts the requested service;

locating, within the global cache, an idle connection configured for a different service on the identified database instance;

repurposing the idle connection configured for the different service, wherein the repurposing includes switching the different service which the idle connection is configured for to the requested service; and directing the request to the requested service on the identified database instance using the repurposed idle connection.

15. The non-transitory computer readable storage medium according to claim 14, wherein the instructions further cause the one or more microprocessors to perform the step of configuring a data defining a service topology on the application server, wherein the service topology describes a plurality of services that the database instances host.

16. The non-transitory computer readable storage medium according to claim 14, wherein the global cache includes one or more connections not attached with a database session.

17. The non-transitory computer readable storage medium according to claim 14, wherein the identified database instance is the least loaded database instance.

18. The non-transitory computer readable storage medium according to claim 14, wherein each connection in the plurality of connection caches associated with the plurality of data sources and the global cache further includes information describing a name of the service that the connection is configured for.

19. The non-transitory computer readable storage medium according to claim 14, wherein the database and application server are used in a multi-tenant cloud environment.

20. The non-transitory computer readable storage medium according to claim 14, wherein when a connection in a connection cache associated with a data source is closed, the connection is stored in the global cache.

* * * * *

UNITED STATES PATENT AND TRADEMARK OFFICE
CERTIFICATE OF CORRECTION

PATENT NO. : 9,747,341 B2  
APPLICATION NO. : 14/253573  
DATED : August 29, 2017  
INVENTOR(S) : Hegde et al.

Page 1 of 1

It is certified that error appears in the above-identified patent and that said Letters Patent is hereby corrected as shown below:

In the Drawings

On sheet 4 of 6, in FIGURE 4, Line 2, delete "Sevice" and insert -- Service --, therefor.

In the Specification

In Column 1, Line 36, delete "2014U.S." and insert -- 2014; U.S. --, therefor.

In Column 1, Line 46, above "FIELD OF INVENTION" insert -- COPYRIGHT NOTICE
A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. --.

In Column 5, Line 15, delete "diagonoseability" and insert -- diagnosability --, therefor.

In the Claims

In Column 10, Line 28, in Claim 1, after "for" delete "to".

In Column 11, Line 14, in Claim 8, after "for" delete "to".

In Column 12, Line 16, in Claim 14, after "for" delete "to".

Signed and Sealed this  
Twenty-ninth Day of May, 2018

Andrei Iancu  
*Director of the United States Patent and Trademark Office*